UNITED STATES PATENT OFFICE.

MORIZ VON GALLOIS, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

PROCESS OF MAKING BROMINDIGO.

SPECIFICATION forming part of Letters Patent No. 706,921, dated August 12, 1902.

Application filed May 27, 1902. Serial No. 109,165. (No specimens.)

*To all whom it may concern:*

Be it known that I, MORIZ VON GALLOIS, chemist, a citizen of the Empire of Austria-Hungary, residing at Höchst-on-the-Main, Germany, have invented certain new and useful Improvements in the Manufacture of Bromindigo-White and Bromindigo, of which the following is a specification.

I have found that by treating indigo-white with bromin a bromindigo-white may be obtained, which on further oxidation is transformed into bromindigo. The exclusion of water is not necessary on bromination.

If, for instance, bromin is allowed to act on free indigo-white as obtained according to known methods in a moist state from natural or artificial indigo, then an energetic absorption of this halogen occurs while the product of reaction becomes heated.

Example: Fifty kilos of a paste of indigo-white corresponding to the contents of twenty kilos of indigo are slowly treated, while stirring, with about twenty-four to thirty-six kilos of bromin. The product of reaction is stirred with water and diluted after the free bromin has disappeared. The bromindigo already formed from bromindigo-white is filtered, neutralized by washing, and dried.

Having now described my invention, what I claim is—

The herein-described process for the manufacture of brominated indigo which consists in causing bromin to react on indigo-white in the proportion requisite for the formation of the product of substitution and in oxidizing the bromindigo-white thus obtained to bromindigo, substantially as set forth.

In testimony that I claim the foregoing as my invention I have signed my name in presence of two subscribing witnesses.

MORIZ VON GALLOIS.

Witnesses:
ALFRED BRISBOIS,
HEINRICH HAHN.